United States Patent [19]

Zambelli

[11] Patent Number: 5,060,457
[45] Date of Patent: Oct. 29, 1991

[54] PASTA HANDLING APPARATUS
[75] Inventor: Gabriele Zambelli, Forli, Italy
[73] Assignee: G.A.P. Tecnica S.r.l., Forli, Italy
[21] Appl. No.: 556,822
[22] Filed: Jul. 23, 1990

[30] Foreign Application Priority Data

Jul. 26, 1989 [IT] Italy .................................. 3567 A/89

[51] Int. Cl.$^5$ ............................................ B65B 35/30
[52] U.S. Cl. ....................................... 53/543; 53/247; 53/251; 198/418
[58] Field of Search ........................ 34/236, 237, 238; 53/154, 247, 251, 531, 534, 537, 539, 543; 99/356; 198/418, 418.7; 419/791.6, 788

[56] References Cited

U.S. PATENT DOCUMENTS

| | | | |
|---|---|---|---|
| 2,573,100 | 10/1951 | Haecks | 53/247 X |
| 3,292,341 | 12/1966 | Frost | 53/247 X |
| 3,464,182 | 9/1969 | Nichols | 53/281 X |
| 4,316,354 | 2/1982 | Loewenthal | 53/247 X |
| 4,525,985 | 7/1985 | Sammens | 53/247 X |
| 4,642,967 | 2/1987 | Culpepper | 53/543 X |
| 4,793,117 | 12/1988 | Raudat et al. | 53/251 X |
| 4,864,801 | 9/1989 | Fallas | 53/247 X |

FOREIGN PATENT DOCUMENTS 7403309  8/1975  France .................................. 53/543

*Primary Examiner*—John Sipos
*Attorney, Agent, or Firm*—Cohen, Pontani & Lieberman

[57] ABSTRACT

Apparatus for automatically removing pasta nests from drying frames and introducing such nests into packaging containers are disclosed. The apparatus comprises a mechanism for interspacing groups of the nests on the drying frames in a checkerboard pattern with respective interspaces between adjacent groups. Also incuded is a mechanism, entering into the mentioned interspaces, for translating the groups of nests in a plane of the groups to respective locations at which the groups respectively pass through an opening transverse to the plane and into packaging containers.

3 Claims, 2 Drawing Sheets

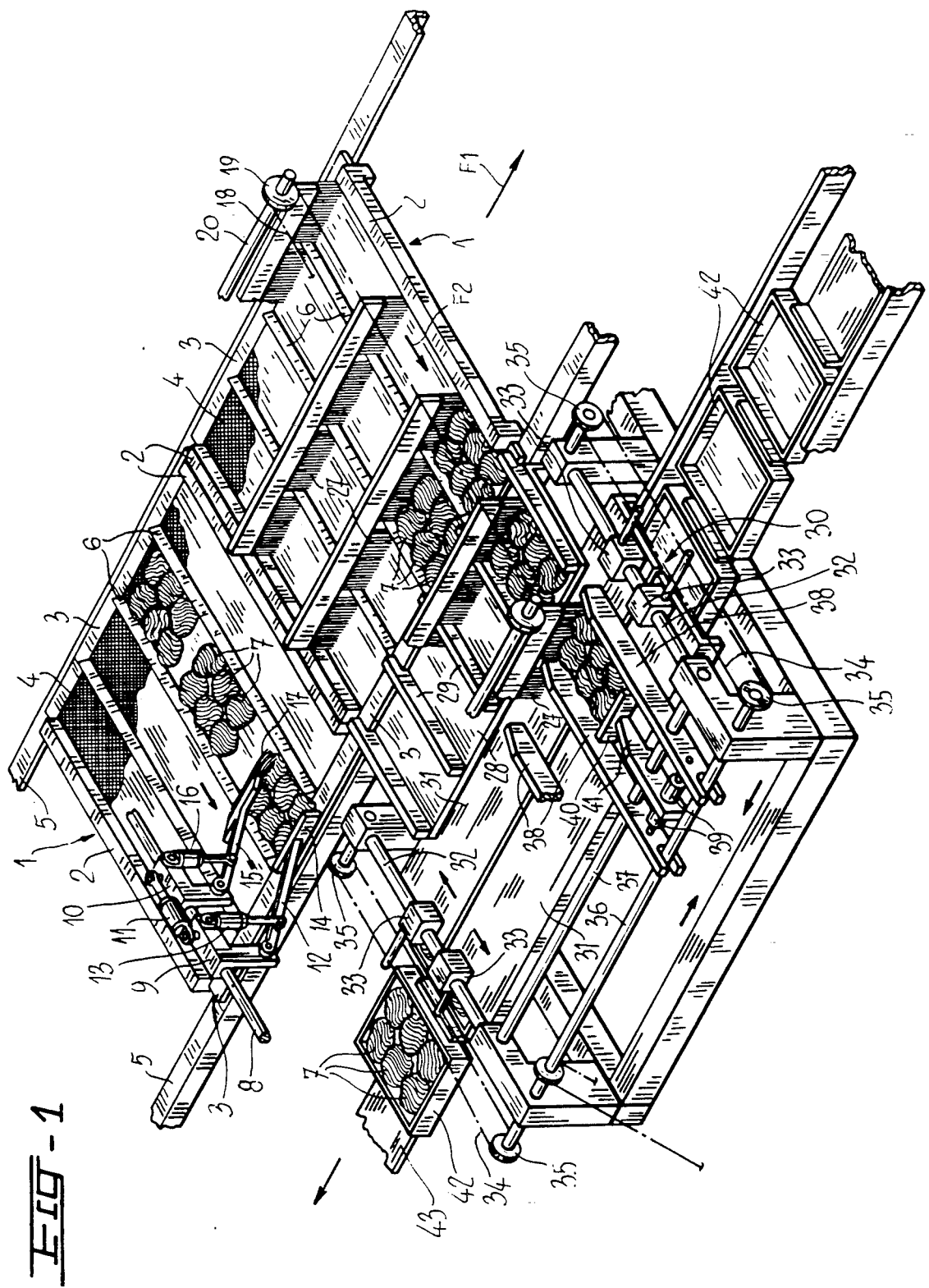

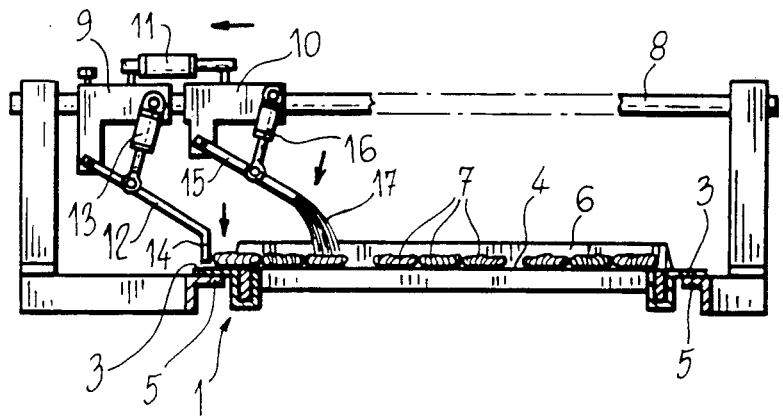
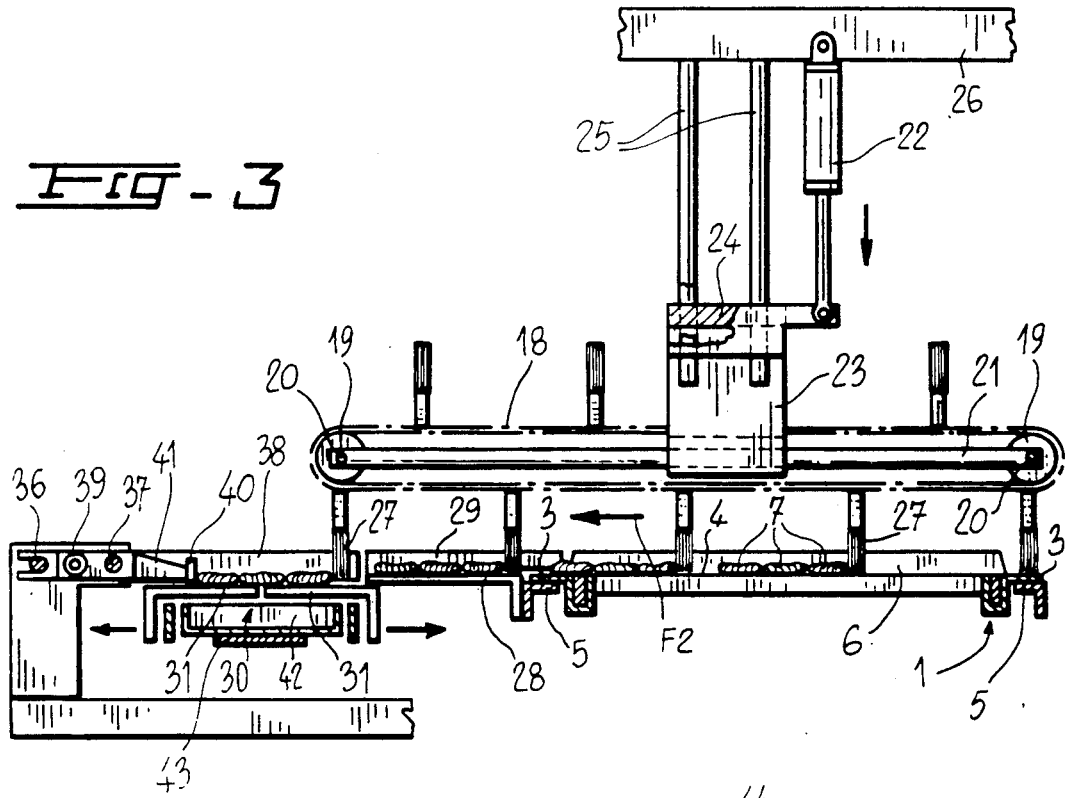
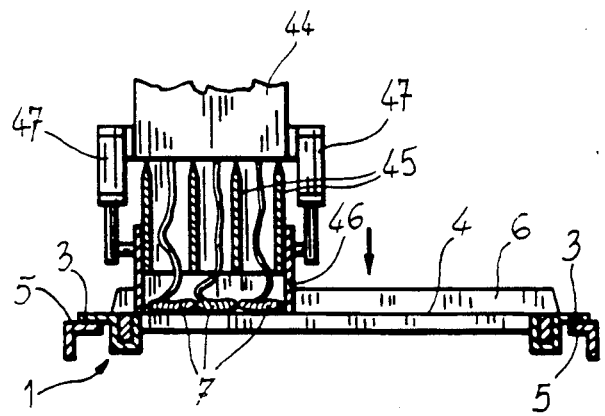

PASTA HANDLING APPARATUS

BACKGROUND AND SUMMARY OF THE INVENTION

The present invention relates to an apparatus for manipulating nests, or skeins, of pasta, and more particularly relates to such an apparatus for automatically manipulating pasta nests from drying frames and inserting them into packaging containers.

Apparatus are known for the industrial production of pasta in the form of tagliatelle, fettucini and the like; such apparatus consists essentially of extrusion mouths against which the pasta is pressed by screws in order to thus be formed into sheets, which then fall onto parallel knives that divide the sheets into strips, which are then caused to descend within parallel vertical cylinders that act as a mold for accumulation, by circumferentially delimiting the deposit on support planes. The lower part of such mold cylinders are vertically moveable to permit the transfer of the accumulations thus formed, constituting the so-called nests or skeins, by sliding of the support planes, and the formation of new accumulations on a subsequent point thereof, and so on.

Such support planes are formed of fine mesh nets stretched within quadrangular frames, caused to move and stop in succession below the mold cylinders to receive a plurality of successive rows of nests or skeins, and then sent consecutively within forced-air circulation chambers in order to be transferred vertically and horizontally there in succession or piled up one after the other, each in this way passing through a plurality of successive piles up to the exit so that during the stay within such chamber the pasta is dried, emerging ready for packaging, which is effected within containers or jars.

In accordance with prior art, the removal of the nests, or skeins, from the frames, coming from the drying chamber, for insertion in the packaging containers is effected manually; more specifically, the frames are inclined on one side, at the same time being imparted vibrations so that the nests slide off them onto conveyor belts from which operators manually remove them in order to insert them into the packaging containers.

The disadvantages of such last production phase in terms of cost for operating personnel are apparent.

Less apparent, but even more disadvantageous, are the drawbacks of this manual technique in terms of loss of product due to manual withdrawal and handling; in this way, in fact, a substantial quantity of skeined delicate strips or strings breaks up, remaining on the removal supports and thus constituting a scrap quantifiable in a percentage of 15 to 20% of the upstream production.

A main object of the present invention is, therefore, to provide an apparatus that is suitable for effecting automatic removal of the nests, or skeins, of pasta from drying frames and insertion thereof into packaging containers without the intervention of human labor.

Another object of the present invention is to achieve the above purpose by an apparatus tat handles the nests, or skeins, of pasta as delicately as possible, without subjecting them to any relatively rough impact, so as to avoid their breaking up and the forming of waste, and however inserting also the remaining reduced waste into the package.

Still another object of the present invention is to attain the above objects through an apparatus that can furthermore be adapted to existing production lines and in particular, which, while providing drying frames modified in their conformation by the requirements of automatic discharge of them, permits their design, however, as suitable to be stacked and transferred, particularly in pre-existing drying chambers, without any drawback or slowdown in production.

Another object of the present invention is to achieve the above objects through a simple and effective apparatus that is reliable in operation and of relatively low cost, with due consideration of the results obtained in practice with it.

The foregoing and still other objects are all achieved by an apparatus for automatic removal of nests, or skeins, of pasta, for instance tagliatelle, lasagna or the like, from drying frames and insertion thereof into packaging containers in accordance with the present invention; such apparatus comprising a station for a checkerboard alignment of groups of the nests on the frames by descent of check sides and packaging brushes, in order to create between such groups parallel channels where, in a second station, transfer brushes are introduced in a succession of rows of the groups outside the frames, which for this purpose are without lateral raised edges, on lateral coplanar flap boards with a trap below to which the packaging containers are caused to pass one after the other.

BRIEF DESCRIPTION OF THE DRAWINGS

Further characteristics and advantages of the apparatus in accordance with the invention will become more clear from the detailed description which follows of a preferred embodiment, shown merely by way of illustration and not of limitation in the accompanying drawings, in which:

FIG. 1 shows a perspective view from above of an apparatus according to the present invention, with certain of its parts in section and others removed in order to better show still other parts;

FIG. 2 is a front view, partially in section, of a first operating station of an apparatus according to the present invention;

FIG. 3 is a front view, partially in section, of a second operating station of an apparatus according to the present invention; and FIG. 4, finally, is a front view in vertical section of a detail of construction of a pasta nest or skein forming unit as preferably modified for automatic removal in accordance with the present invention.

DETAILED DESCRIPTION OF THE PREFERRED EMBODIMENT

A description of the individual parts of the inventive apparatus is set forth immediately below, followed by a description of operation of the inventive apparatus.

Apparatus Parts

Referring to the figures, and in particular to FIG. 1, the reference number 1 indicates generally the quadrangular frames described by equal parallel sides 2, shaped at the bottom as a bridge or head and tail (with reference to the orientation of their length) and equal parallel side wings 3 which define a thin mesh net 4 stretched substantially coplanar to the upper level of the lateral wings 3.

The frames 1 are slidable on a pair of parallel tracks 5 which encounter the bottom of the lateral wings 3 respectively; the frames 1 are furthermore provided with equidistant strips 6 which are parallel to each other as well as to the sides 2 or transverse to the wings 3 and the tracks 5; between the parallel strips 6 there rest on the net 4 nests, or skeins, of pasta, for example tagliatelle, from now on referred to simply as nests and indicated by the reference number 7.

On the top of a first portion of the tracks 5, referred to the direction of advance of the frame 1 indicated by the arrow F1 (or in correspondence with a first station of them for the functions that are further illustrated below), there are transversely suspended on the tracks 5 parallel bars 8, only one of which is shown in FIG. 1.

On each of the bars 8 there are provided consecutive pairs of sleeves 9 and 10, only two of which are shown in FIGS. 1 and 2; each sleeve 9 is arranged adjustably fixed on its own bar 8, while each sleeve 10 is slidable thereon—for the functions explained in further detail below—by means of a pneumatic piston 11 which connects it to the corresponding fixed sleeve 9.

Furthermore, under each fixed sleeve 9 (see also FIG. 2), there is pivoted an arm 12 which is vertically moveable due to a pneumatic piston 13; the arm 12 is provided on the bottom with a cross bar 14 perpendicular to the bar 8, adapted to constitute a checking side on the plane of the net 4 transverse to consecutive strips 6, or between a strip 6 and the adjoining side 2, for the purposes which are explained in further detail below; for the same functions, under each slidable sleeve 10 there is pivoted an arm 15 which is vertically moveable due to a pneumatic piston 16; such arm 15 is provided on the bottom with a small brush 17 perpendicular to the bar 8 and adapted to enter transversely between two consecutive strips 6 or between a strip 6 and the adjoining side 2.

It should be noted that for the functions that are described in further detail below, on each bar 8 the units formed of the fixed sleeves 9 and slidable sleeves 10, connected respectively by the pistons 11, have a position of mirror symmetry with respect to the central transverse axis of each bar 8; or, with reference to such axis of symmetry, the fixed sleeves 9 on both sides are provided towards the outer side with respect to the corresponding slidable sleeves 10.

Above a second portion of the tracks 5, the same reference to direction as above (or corresponding to a second station of the frames 1 for the functions that will be described in further detail below), transverse to the tracks 5 there are stretched on them two parallel chains 18 closed on themselves (see also FIG. 3), respectively wound on pinions 19 borne by shafts 20 parallel to the tracks 6 and pivoted at the respective ends by parallel beams 21; the latter, at one end (see FIG. 3) each arrive and are set on one of the tracks 5 while, at the opposite end, they reach and enter into the other track 5, to the outer portion thereof with respect to the space defined between the tracks 5.

The beams 21 and thus the entire unit formed of the shafts 20 and of the chains 18 are vertically alternately moveable—for the purposes described in more detail below—by means of a pneumatic piston 22, which, for these purposes are connected to brackets 23 connected by a bridge 24 where guide bars 25 pass through above and are rigidly connected to a fixed beam 26.

The bar of chains 18 transversely supports a plurality of equally spaced brushes 27 which are therefore parallel to the tracks 5 and are moved stepwise in known manner by the chains 18 themselves in the direction indicated by the arrow F2 in FIG. 3; such equally spaced brushes 27 have a length equal to the distance between the sides 2 of one and the same frame 1 and preferably have interruptions in continuity of the respective bristles in correspondence with the strips 6 of a frame 1 when the latter stops below them in the manner and for the purposes further illustrated below.

Below the chain portions 18 protruding outside of the space bounded by the tracks 5 there is provided a bracket 28, coplanar with the nets 4 and the side wings 3 of the frames 1, which extends transversely over a distance equal to the distance between two consecutive brushes 27 and is also provided with fixed transverse strips 29 as a continuation of the strips 6 of the frames 1 when the latter stop below the brushes 27, for the functions which are explained in further detail below.

On the other side of the bracket 28 there is provided, parallel to it, a flap board, otherwise called a "flap", indicated generally as 30 and of the same length as the bracket 28 itself, and formed of two wings 31 longitudinally subdivided at the middle and adapted to be moved apart there to slide in mutually opposite directions on parallel bars 32 by means of slidable sleeves 33 fastened to the respective ends of the wings 31 themselves; this alternate travel is controlled by two parallel chains 34 of alternate movement, for this purpose closed on themselves and wound on respective pinions 35 of which the drive pinions are connected by a shaft 36; on respective opposite sections of such chains 34 there are attached the slidable sleeves 33 according to whether the latter are attached to one or the other of the wings 31.

On the side of the shaft 36 there is provided a bar 37 on which there are slidably pivoted parallel strips 38, held horizontal, since furthermore engaged by respective fork guides in the shaft 36 itself, and extending on the flap board 30 transversely to the latter; only two of the strips 38 are shown in FIG. 1, but they are provided in a number equal to the number of strips 29 of the bracket 28 and interact with them in the manner and for the purposes that will be described further below; for these functions, the strips 38 are furthermore moveable transversely by means of pneumatic pistons 39.

Between the moveable strips 38 and transverse to them there protrude on the flap board 30 edges 40 fastened by arms 41 to the bar 37.

Below the flap board 30 and longitudinal to it, containers 42 are caused in succession to pass and stop by means of a conveyor belt 43.

In FIG. 4 there is finally shown a unit for forming the nests 7 of pasta, as preferably modified in order—in the manner described in more detail below—to prearrange the nests 7, already at the level of formation thereof, for automatic handling in accordance with the present invention; such unit comprises an extruder, illustrated diagrammatically and indicated by the reference number 44, debouching into parallel vertical cylinders 45, the lower part of which is indicated by 46 and is referred to as a "spy glass" in technical terminology.

This spy glass 46 encounters at the bottom a portion of the net 4 of the frames 1 and is vertically moveable by means of pneumatic pistons 47; in accordance with the preferred embodiment of the present invention furthermore, the cylindrical portions of which it is formed communicate internally with each other.

Apparatus Operation

The apparatus of the present invention operates in the following manner.

The frames 1, emerging from a drying chamber of known type, slide in succession by successive steps in known manner on the tracks 5, supporting on the corresponding portions of net 4, interposed in the strips 6, rows of nests 7; in the example described, two rows of nests 7 in each space between strips 6 parallel to the latter During the stay of each frame 1 at the first station, or below the bars 8, the respective arms 12 of the outermost stationary sleeves 9 or those provided towards each of the ends of the bars 8 themselves, descend, actuated by the corresponding pneumatic pistons 13, thus bringing the respective cross members 14 to constitute an encounter edge on each of the wings 3, transverse to the strips 6, in each space between them (see FIG. 2); almost at the same time the corresponding arms 15 of the slidable sleeves 10 which are connected to said outermost stationary sleeves 9 descend, actuated by the corresponding pneumatic pistons 16, and immediately the pneumatic pistons 11 pull the slidable sleeves 10 against the stationary sleeves 9 so that the brooms 17 of the arms 15 descend on the nests 7, exerting traction on a group of the latter (formed of six nests in the example described) and piling such group onto the corresponding edge cross-member 14 or placing it in the outermost possible position up to on the wings 3 (see also FIG. 1).

Immediately after the internally bordering sleeve units 9/10, with respect to the external units which have as above acted first, said operation is carried out, pushing a corresponding group of nests 7 outward; and so on in this order until all the respective units of sleeves 9-10 operate, pushing respective groups of nests 7 at progressively reduced distances apart so as to arrive at a checkerboard alignment of the groups of nests 7 on all the frames 1, with the same interruptions of continuity or channels parallel to the direction of advance of the latter between the groups of nests 7.

In such interruptions of continuity or channels between groups of nests 7, when the frames 1 stop in the following step or in the second station, the brushes 27 are introduced, caused for this purpose to descend, via the unit which supports them, by the pneumatic piston 22; once descended, the brushes 17 are caused to move consecutively in successive steps in accordance with the arrow F2 of FIG. 3, carried along for this purpose in known manner by the chains 18, accordingly carrying along in the same direction between all the strips 6 the groups of nests 7 out of the frame 1; notwithstanding this, the conformation of the latter, being provided for this purpose with lateral wings 3 coplanar to the support nets 4 of the nests 7.

The groups of nests 7, thus taken out of the frames, halt initially for one step on the bracket 28 between the strips 29 of the latter which are located as a continuation of the strips 6 of the frames 1 when the latter stop there, such bracket 28 being provided in order to avoid interferences between the sliding means of the frames 1 and the opening means of the flap boards 30; in the next step, the groups of nests 7 then arrive on the latter until encountering the edge 40; through each row of groups of nests 7 which arrives on the flap board 30, the strips 38, which during the translation stop in continuation of the strips 29 of the bracket 28, are brought by the respective pneumatic pistons 39 to move alternately transversely, thus compacting the groups of nests 7 which have arrived between them in order, if necessary, to dimension them in such a manner as to fall within the shape of the packaging container 42 referred to above Immediately thereafter, in fact, the wings 31 of the flap boards 30 move apart, drawn by the chains 34, so that the groups of nests 7 each descend into a container 42, brought there in known manner to a stop by the belt 43; after this, the wings 31 close for a subsequent operating cycle by reverse movement of the chains 34

In order to facilitate the cohesion between the nests 7 and to form the individual groups intended to be packed in a container 42, such nests 7 can preferably be provided mutually combined in said groups by strings of pasta; for this purpose, upstream of the automatic removal apparatus described above, the vertically moveable lower part 46 or spy glass of the mold cylinders 45 (see FIG. 4) can be provided with internally inter-communicating vertical intervening spaces so that some strings of pasta fall into such spaces in order to constitute the bonding.

As is apparent from the foregoing description of a preferred embodiment and its manner of operation, the apparatus in accordance with the present invention offers considerable advantages, namely:

The apparatus described above and claimed below makes completely automatic the cycle of removing nests of pasta from drying frames and inserting thereof into containers for placing in commerce, without intervention of a human operator, except for mere verification, and with the consequent savings in terms of expense for labor and, furthermore, with regard to hygiene.

The foregoing is obtained, moreover, without subjecting the nests to damage of any type, they being handled at all times on the same plane by delicate brushes, with the sole difference of the falling of the flap into the underlying containers, which, moreover, is negligible because of very limited course and, in any event, without any loss of the reduced waste generated therein because even this falls back into the container since brushed within this The inventive apparatus can be adapted to pre-existing plants, where the structuring of the frames in accordance with the present invention, or with the coplanar sides to the net and the consequent projection of the nests with respect to the horizontal shape of the frames, is obviated by providing the head and tail sides of the frames themselves with a lower bridge so that such frames can also slide one on the other in the known drying chambers without interfering with the nests transported by the other frames and without reducing the number of stackable frames in the known drying chambers.

It should be understood that the preferred embodiments and examples described are for illustrative purposes only and are not to be construed as limiting the scope of the present invention which is properly delineated only in the appended claims.

What is claimed is:

1. An apparatus for removing pasta nests from drying frames and introducing said nests into packaging containers, comprising:

first grouping means for grouping a number of said nests in a checkerboard pattern with respective interstices between adjacent groups of said nests, said grouping means comprising: at least one individual brush means mounted on at least one armature and vertically displaceable by piston means; and fixed cross bar means corresponding in number to said brush means, wherein each cross bar means faces a select brush means at a predetermined distance from said brush means to enable cooperative interaction between said brush means and said cross bar means to collect and form one group of said nests for each pair of brush means and cross bar means;

moving means for taking said grouped nests from said first grouping means and moving said nests in a first planer direction;

second grouping means for receiving said grouped nests from said first grouping means via said first moving means in said first planer direction, and moving said nests in a second planer direction perpendicular to said first planer direction, said second grouping means comprising a plurality of equally spaced brushes transversely supported by two parallel endless chains, said chains supported by two parallel beams, said beams vertically and alternatively movable by means of piston means, wherein said chains move said brushes and said brushes move said groups in a direction substantially perpendicular to the direction that said groups were moved by said moving means to said second grouping means thereby delivering a group of nests to third grouping means; and third grouping means for receiving a predetermined number of grouped nests from said second grouping means, said third grouping means comprising at least one flap-board and conveyor means below said flap-board carrying a plurality of containers, means for opening and closing said at least one flap-board so that each flap-board receives at least one nest while said flap-board is in a closed position and deposits said received nest into a container when said flap-board is in an open position, and said conveyor means carries the container carrying said nest away from said third grouping means while simultaneously delivering an empty container thereto.

2. The apparatus of claim 1, wherein said flap-board comprises median spreading wings in a plane.

3. The apparatus of claim 1, further comprising extrusion means for creating said nests, said extrusion means positioned upstream from said drying frames and comprising extrusion mouths having lower mold portions, such that as extruded pasta passes through said lower mold portions onto said drying frames intercommunication between said pasta nests is established by maintaining at least one common thread of pasta between at least two successive nests.

* * * * *